May 20, 1969   N. HAHON   3,445,340
ROTOR CHAMBER INSERT
Filed Aug. 25, 1966

INVENTOR.
Nicholas Hahon

BY Harry M. Saragovitz,
Edward J. Kelly, Herbert Berl
& Muzio B. Roberts
ATTORNEYS

United States Patent Office 3,445,340
Patented May 20, 1969

3,445,340
ROTOR CHAMBER INSERT
Nicholas Hahon, Frederick, Md., assignor to the United States of America as represented by the Secretary of the Army
Filed Aug. 25, 1966, Ser. No. 575,500
Int. Cl. C12b 1/02; B65d 41/04
U.S. Cl. 195—127                                   5 Claims

ABSTRACT OF THE DISCLOSURE

A sealed container having a cover slip positioned on the bottom thereof. In operation, a cell culture is positioned on the cover slip and a virus suspension introduced thereon. The sealed container is then subjected to centrifugation to inoculate the cell culture.

---

The invention described herein may be manufactured and used by or for the Government of the United States of America for governmental purposes without the payment to me of any royalty thereon.

This invention relates in general to a rotor chamber insert assembly and more particularly to a rotor chamber insert assembly utilized in a high speed centrifuge for the virus inoculation of cell cultures.

The virus inoculation of cell cultures utilizing centrifugal means is known in the art. Weiss, et al. discloses the centrifugation of rickettsiae virus onto cell cultures utilizing centrifugation means (Proc. Soc. Exptl. Biol. Med., vol. 103, pp. 691–695). The rotor chamber insert utilized comprised a glass tube suitably contoured to fit within the arm of the rotor of a swinging bucket type centrifuge. A cover slip, which served as a repository for the cell culture, was positioned in the bottom of the tube. The cell culture was inoculated with a virus and subjected to a centrifugation at around 9000 times gravity.

With smaller viruses, higher centrifugation is required in order to obtain the desired inoculation. However, the glass tube insert is only suitable at low or moderate centrifugation speeds, in that it has a tendency to break at high speeds. Furthermore, the rotor of the swinging bucket type centrifuge could only handle one sample of the cell culture at any given time.

In addition to the utilization of centrifugation means, cell cultures have been inoculated by stationary means. Generally the viruses are introduced onto the cell cultures and incubated for a period of 2 to 4 hours to let the virus sediment onto the cells. However, the stationary method of inoculation is not considered satisfactory. In addition to the long waiting period, the incubation of virus and cell cultures in a stationary position is not efficient. It has been determined that approximately only about 30 to about 50% of the virus introduced into the cell culture eventually reaches the cells to infect them. Therefore, in quantitative assays, a true determination is not made of all the virus particles in a suspension. Furthermore, if an accurate measurement of the time between the adsorption of a virus particle onto a cell and certain subsequent desired results are to be made, it is necessary to know the moment of adsorption rather than the fact that it occured at sometime during a several hour period.

It is an object of the invention to provide and disclose a rotor chamber insert assembly for the centrifugal inoculation of cultures.

It is a further object of the invention to provide and disclose a rotor chamber insert assembly capable of withstanding high speed contrifugation.

It is further object of the invention to provide and disclose a rotor chamber insert assembly comprising a configuration wherein several assemblies may be utilized in the single arm of a rotor.

It is a further object of the invention to provide and disclose a rotor chamber insert assembly which is simple and compact in design.

It is a further object of the invention to provide and disclose a rotor chamber insert assembly capable of withstanding sterilization temperatures and pressures.

It is a further object of the invention to provide and disclose a rotor chamber insert assembly capable of being utilized with a conventional laboratory centrifuge.

Other objects and a fuller understanding of the invention may be had by referring to the following description and claims taken in conjunction with the accompanying drawing in which:

Figure 1:
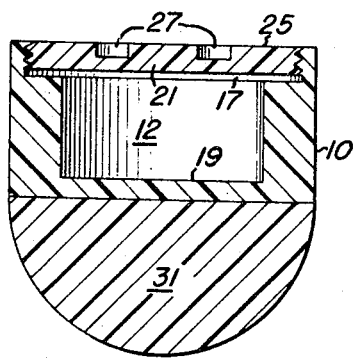
FIG. 1 shows a sectional view of the rotor chamber insert assembly.
Figure 2:
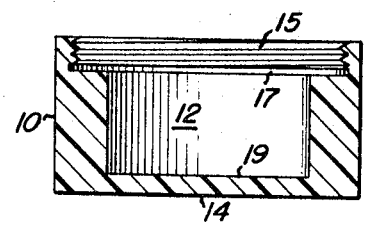
FIG. 2 shows a sectional view of the container component of the rotor chamber insert assembly.
Figure 3:
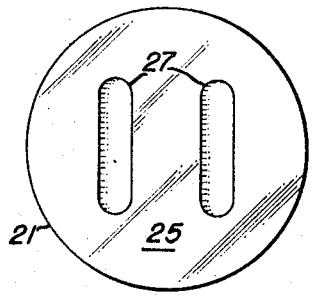
FIG. 3 shows a top view of the lid component of the rotor chamber insert assembly.
Figure 5:
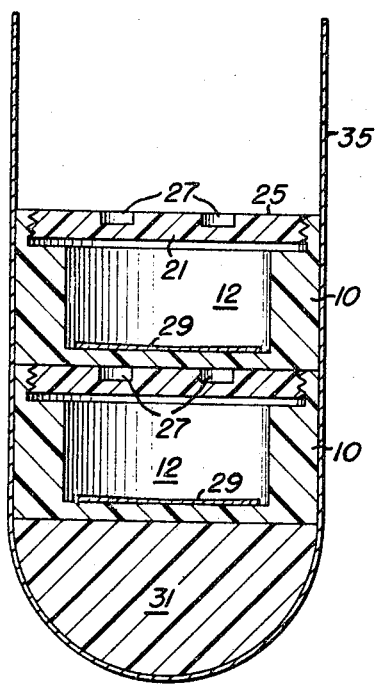
FIG. 5 shows a sectional view of the rotor chamber insert assembly comprising two container and lid components positioned within the arm of a swinging bucket type centrifuge.
Figure 4:
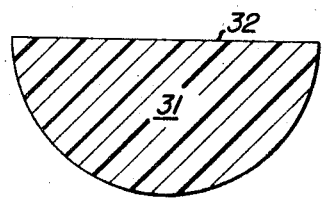
FIG. 4 shows a sectional view of the bottom spacer of the rotor chamber insert assembly.

Referring now to the drawings, the rotor chamber insert assembly comprises a cylindrical container 10 having a lip 17 and internally threaded section 15 at the open end thereof as shown in FIG. 2. Cylindrical container 10 is sealed by means of lid 21 which comprises an externally threaded circular configuration, as shown in FIG. 1, thereby forming chamber 12. Positioned on surface 25 of circular lid 21 are parallel recesses 27 comprising an elongated configuration. The twin recesses are suitably contoured to be compatible with the grasping ends of laboratory forceps thereby facilitating their removal from the arms of the rotor. Spacer 31, which comprises a rounded bottom, is suitably contoured to be compatible with the bottom portion of arm 35 of the rotor section of a centrifuge. Bottom section 14 of cylindrical container 10 is supported on top portion 32 of spacer 31. The spacer inhibits the wedging or jamming of cylindrical container 10 within arm 35 of the centrifuge during high speed centrifugation.

Illustrative, but without limitation, the assembled cylindrical container component within the scope of this invention comprises a diameter of 1″ and height of 0.5″.

The rotor chamber insert assembly may be constructed of any material which is capable of withstanding the stresses resulting from high speed centrifugation and conventional laboratory sterilization techniques while possessing the additional attribute of being non-toxic or non-detrimental to the material under investigation.

A rotor chamber insert constructed of a plastic material, i.e., Delrin, was found satisfactory. However, a nylon or lexan polycarbonates resin material is also considered suitable.

The efficiency of centrifugation for the adsorption of yellow fever virus onto coverslip cell monolayers was determined at different centrifugal speeds. A plasma suspension of the Asibi strain of yellow fever virus was used. The infective plasma was obtained from a rhesus monkey that had been inoculated by the intraperitoneal route with $6\times10^{14}$ mouse intracerebral $LD_{50}$ ($MICLD_{50}$) units of virus and bled three days. The plasma was divided into 1-ml. portions, sealed in glass vials, and stored at −60° C. The plasma suspension of virus had a titer of $10^{8.1}$ $MICLD_{50}$. The plasma was diluted and introduced in 0.2 ml. volumes directly onto a coverslip of McCoy's cell culture. The samples were centrifuged for a period of 15 minutes at a temperature of 25° C. Approximately 95% of the virus was adsorbed within 15 minutes. The results in Table 1 show that comparable assay values were obtained with centrifugal speeds of 10,000 to 22,500 r.p.m.

TABLE 1

| Runs | R.p.m. | Centrifugal force (r.p.m. times gravity) | Cell-infecting units of virus (per ml.) |
|---|---|---|---|
| 1 | 2,000 | 523 | $5.3\times10^{6}$ |
| 2 | 3,000 | 1,177 | $3.1\times10^{7}$ |
| 3 | 5,000 | 3,270 | $5.8\times10^{7}$ |
| 4 | 10,000 | 13,080 | $1.1\times10^{8}$ |
| 5 | 15,000 | 29,430 | $1.0\times10^{8}$ |
| 6 | 20,000 | 52,320 | $1.1\times10^{8}$ |
| 7 | 22,500 | 65,400 | $1.0\times10^{8}$ |

Yellow fever virus adsorption onto McCoy's cell cultures was carried out with the inoculated cell cultures maintained in a stationary position at temperatures of 25 and 35° C. A maximum of 30% of the virus inoculum was adsorbed. The results are shown in Table 2 below:

TABLE 2

| Runs | Temperature | Hours | Virus inoculum adsorbed (percent) | Cell-infecting units of virus (per ml.) |
|---|---|---|---|---|
| 1 | 25 | 4 | 22 | $3.1\times10^{7}$ |
| 2 | 35 | 2 | 30 | $3.1\times10^{7}$ |

The efficiency of centrifugation for promoting virus adsorption from different volumes of inoculum is given in Table 3. The results revealed a proportionality between the number of fluorescent cells and volume of inoculum. No proportionality was noted when similar volumes of inoculum were introduced onto coverslip cell cultures and maintained in a stationary position of 35° C. for two hours. The rate of cell-virus contact appeared to be independent of the volume of inoculum when centrifugal force was employed.

TABLE 3

| Runs | Volume, mls. | Fluorescent cells per 50 fields | Cell-infecting units of virus per ml. × 10 |
|---|---|---|---|
| 1 | 0.1 | 78 | 1.4 |
| 2 | 0.2 | 154 | 1.5 |
| 3 | 0.5 | 360 | 1.5 |
| 4 | 1.0 | 711 | 1.5 |

Although I have described my invention with a certain degree of particularity, it is understood that the present disclosure has been made by way of example and that numerous changes in the details of construction and the combination and arrangement of parts may be resorted to without departing from the spirit and the scope of the invention as hereinafter claimed.

Having described my invention, I claim:

1. In a rotor chamber insert assembly having utility in the virus inoculation of cell cultures comprising container means having a cell culture repository means positioned therein, the improvement comprising: cylindrical flat bottom container means having an internally threaded section at an open end thereof, an externally threaded circular flat top lid suitably contoured to be compatible with the internally threaded section of the cylindrical container means thereby forming a chamber having equal top and bottom dimensions, said lid having recesses on the top surface thereof, separate support means for said cylindrical container means having a flat top and a rounded bottom suitably contoured to be compatible with a bottom portion of an arm of a rotor section of a centrifuge, said rotor chamber insert being constructed of a material capable of withstanding a centrifugal force of 13,080 to 65,400.

2. A device in accordance with claim 1 comprising a series of cylindrical container means.

3. A device in accordance with claim 1 wherein the material comprises a plastic.

4. A device in accordance with claim 1 wherein the material comprises nylon.

5. A device in accordance with claim 1 wherein the material comprises a lexan polycarbonate resin.

References Cited

UNITED STATES PATENTS 3,115,460 12/1963 McCormick ---------- 23—292
3,140,007 7/1964 Nettleship ---------- 220—39

ALVIN E. TANENHOLTZ, *Primary Examiner.*

U.S. Cl. X.R.

23—292; 215—1; 220—39